United States Patent
Nguyen (10) Patent No.: US 6,906,433 B2
(45) Date of Patent: Jun. 14, 2005

(54) METHOD AND APPARATUS FOR REGULATING THE EFFICIENCY OF A POWER SUPPLY IN A COMPUTER SYSTEM

(75) Inventor: Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/170,321

(22) Filed: Jun. 11, 2002

(65) Prior Publication Data

US 2003/0227281 A1 Dec. 11, 2003

(51) Int. Cl.[7] .................................................. H01H 3/26
(52) U.S. Cl. .............................. 307/31; 307/80; 307/83; 307/140
(58) Field of Search ........................................... 307/31

(56) References Cited

U.S. PATENT DOCUMENTS 5,481,178 A * 1/1996 Wilcox et al. .............. 323/287

2003/0014675 A1 * 1/2003 Lee
2003/0065497 A1 * 4/2003 Rhoads

* cited by examiner

Primary Examiner—Robert L. DeBeradinis
(74) Attorney, Agent, or Firm—Rob D. Anderson (57) ABSTRACT

A computer system having multiple components capable of being in either a wake or sleep state includes a power manager and a voltage regulator. The power manager may generate a power state status signal indicating the power states of the components, and this signal may be provided to the voltage regulator. In response, the voltage regulator may operate in a synchronous mode when the power state status signal indicates that the components are in a wake state. The voltage regulator may operate in a non-synchronous mode when the power state status signal indicates that the components are in a sleep state.

55 Claims, 3 Drawing Sheets

METHOD AND APPARATUS FOR REGULATING THE EFFICIENCY OF A POWER SUPPLY IN A COMPUTER SYSTEM

The present invention relates to computer systems and more particularly to improving the efficiency of a switching voltage regulator that supplies power to multiple components of a computer system.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of electric power drawn by a computer system is to design the system such that it is capable of operating in two different states. In a first state of operation, only the most vital functions of the system, such as those dedicated to monitoring for user input, are active. This may be referred to as a "sleep state." During the sleep state, the computer system draws very little power from the voltage regulator (alternatively referred to as the power supply/source, voltage supply/source, or Vcc supply/source). In a second state of operation, the computer system is busy executing instructions to accomplish a particular task. This is referred to as the "wake state." During the wake state, the computer system consumes a significant amount of power from the power supply.

Unfortunately, a voltage regulator may be designed to operate more efficiently during a wake state than during a sleep state, resulting in poor average power ED consumption over an extended period of time.

The present invention addresses this and other issues associated with the prior art.

BRIEF DESCRIPTION OF THE DRAWINGS

Embodiments of the present invention are illustrated by way of example and not limitation in the accompanying figures in which like references indicate similar elements and in which.

DETAILED DESCRIPTION

In accordance with an embodiment of the present invention, a voltage regulator may supply a voltage (alternatively referred to as power or Vcc) to multiple components within a computer system. A power manager of the computer system may generate a power state status signal indicating the power states of the components, and this signal may be provided to the voltage regulator. In response, the voltage regulator may operate in a synchronous mode when the power state status signal indicates that the components are in a wake state. The voltage regulator may operate in a non-synchronous mode when the power state status signal indicates that the components are in a sleep state. In this manner, the voltage regulator may operate with improved power conversion efficiency. A more detailed description of embodiments of the present invention, including various configurations and implementations, is provided below.

As used herein, the terms "wake" and "sleep" are relative indications of the power state of one or more components. A component in a wake state may generally consume more power, on average, than the same component in a sleep state. In accordance with one embodiment, a component in a wake state may be either in an operational state or is ready for operation (i.e. receiving, transmitting, or accessing data or ready to receive, transmit, or access data). A component in a sleep state may be in a non-operational state. For example, a component that manipulates or communicates data utilizing an internal clock signal for synchronization may be considered to be in a wake state while the internal clock is running and in a sleep state while the internal clock is stopped. As another example, a device such as a hard drive, floppy drive, or DVD may be considered to be in a wake state while its storage medium is spinning and in a sleep state while its storage medium is not spinning (or is spinning at a speed that is less than a predetermined speed).

For one embodiment, the terms "wake" and "sleep" may be interpreted in accordance with the ACPI specification (Advanced Configuration and Power Interface Specification, Rev. 2.0, published Jul. 27, 2000, by Compaq, Intel, Microsoft, Phoenix, and Toshiba), but is not to be so limited. Note that what is referred to herein as a sleep state may alternatively be referred to as an inactive, power-down, deep power-down, deep sleep, low power, suspend, or idle state.

As used herein, the term "when" may be used to indicate the temporal nature of a power state transition. For example, the phrase "a signal is sent to the voltage regulator when the component transitions to a sleep state" is to be interpreted to mean that the signal may be sent before, after, or during the transition into the sleep state, but is nonetheless associated with that transition into the sleep state. In addition, as used herein, the term "while" is intended to mean during all or some portion of time within the period of time that satisfies a condition. For example, the statement "event 'A' occurs while event 'B' occurs" is intended to mean that event A may occur during all or some portion of the period of time during which event B occurs.

Figure 1:
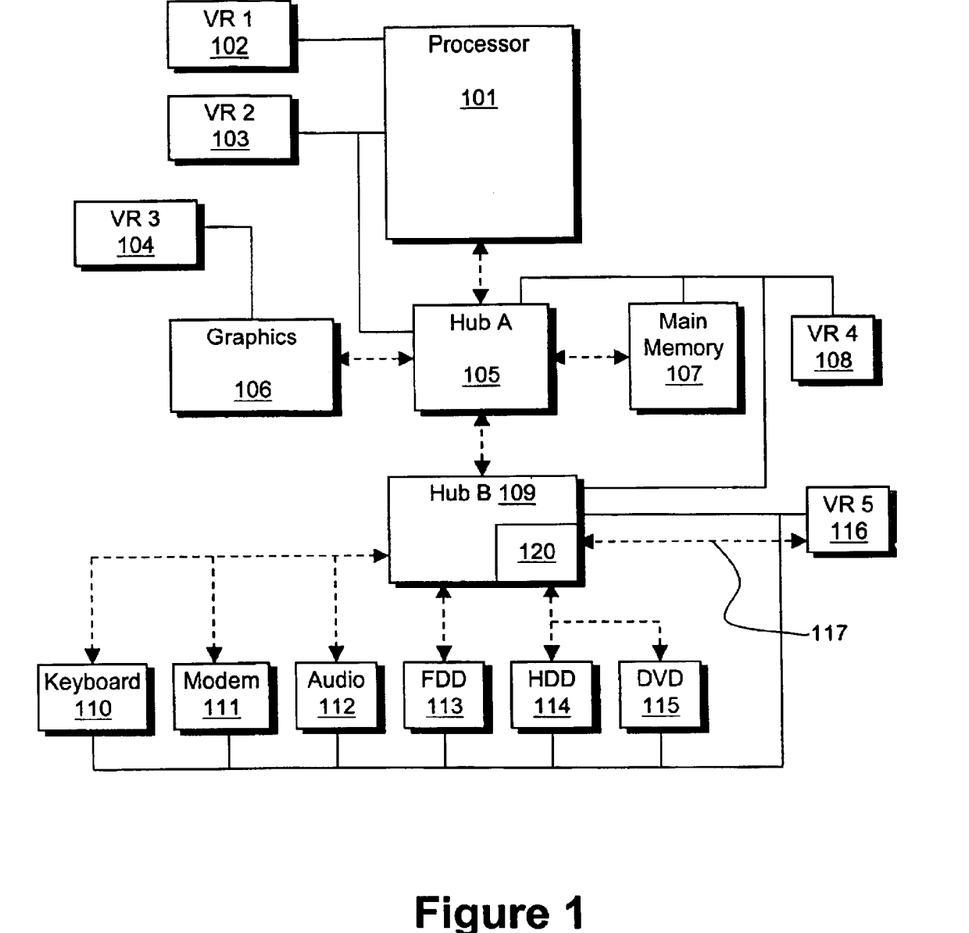
FIG. 1 includes an example of a computer system.

FIG. 1 includes a computer system formed in accordance with an embodiment of the present invention. Processor 101 is coupled to Hub A 105 to communicate with memory 107, graphics controller 106, and Hub B 109. Hub B is, in turn, coupled to several peripheral input/output devices, including, for example, keyboard 110, modem 111, audio device 112, floppy disk drive 113, hard disk drive 114, and DVD 115. The computer system of FIG. 1 additionally includes multiple voltage regulators (VRs) to supply power at different voltage levels to the various components of the system. For example, VR1 102 supplies power to processor 101. VR2 103 supplies power to both processor 101 and to Hub A 105. VR3 104 supplies power to graphics controller 106. VR4 108 supplies power to Hub A 105, memory 107, and to Hub B 109. VR5 116 also supplies power to Hub B 109 as well as to keyboard 110, modem 111, audio device 112, floppy disk drive 113, hard disk drive 114, and DVD 115. Hub B 109 may include power manager 120.

In accordance with alternate embodiments, a computer system may include more or fewer components than those shown in FIG. 1, and the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a micro-controller, etc.

Note that some voltage regulators of FIG. 1 supply power to a single component while other voltage regulators supply power to multiple components. In addition, some components receive a voltage supply from only a single voltage regulator while other components receive multiple voltage supplies from multiple voltage regulators. It is to be appreciated that in accordance with alternate embodiments of the present invention, alternate couplings of voltage regulators to these and other components of a computer system may be implemented.

Multiple components of the computer system of FIG. 1 may be capable of entering wake and sleep states. For example, as described above, hard disk drive 114 and DVD 115 may be considered to be in a sleep state when their respective storage mediums are not spinning. Other components, such as processor 101, may have various wake and sleep states. For example, processor 101 may have a fully operational wake state, a partially operational wake state, a partial sleep state, a regular sleep state, a deeper sleep state, etc. These different levels of wake and sleep states may have various current consumption levels associated with them.

In accordance with an embodiment, the power states of the various components of the computer system of FIG. 1 may be indicated to one or more voltage regulators by a power state status signal via a power state status signal line. For example, the power state of peripheral devices 110–115 of FIG. 1 may be indicated to VR5 116 by a power state status signal from power manager 120 via power state status signal line 117.

The power state status signal may be a signal generated by any power manager within the computer system to indicate the power state of individual or multiple components within the system. This power manager may reside centrally within a hub or bridge (often contained in a chipset) of a computer system, or, alternatively, it may reside centrally within another component of the computer system, or as a discrete component. In accordance with an alternate embodiment, it may be distributed across multiple components of the computer system. For example, each component coupled to a voltage regulator may send its own power state status signal separately to the voltage regulator to indicate its power state. It is to be noted that the power state status signal proved to the voltage regulator may indicate a power state transition of an associated component (or of multiple components) before, after, or during the power state transition of the component.

In accordance with an embodiment, the power state status signal provided to VR5 116 via signal line 117 of FIG. 1 may indicate the power state of multiple ones of peripheral devices 110–115. For example, the power state status signal may indicate the power state of drives 113–115, collectively. In accordance with an embodiment, the power state status signal may be a serial or parallel signal that indicates the power state of various components independently, collectively, or in any grouping.

In accordance with one embodiment, the power state status signal provided to the voltage regulator to indicate wake and sleep states of the components may be a signal associated with the ACPI specification. For example, the power state status signal may indicate an ACPI S3 state, as described in the ACPI specification. Alternatively, the power state status signal may indicate any suspend to RAM, suspend to disk, or other suspend state.

Figure 2:
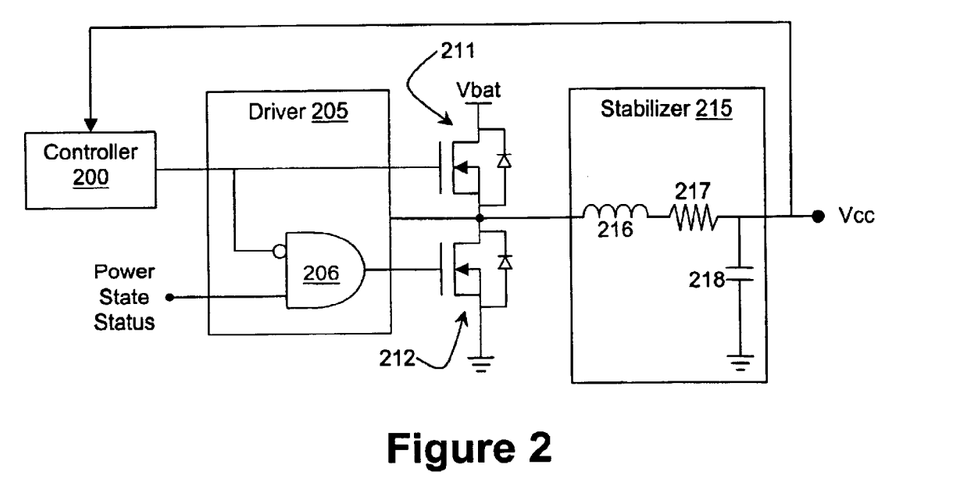
FIG. 2 includes an example of a first circuit.

FIG. 2 includes an example of a circuit in accordance with an embodiment. The circuit of FIG. 2 may be a switching voltage regulator that supplies power to at least a portion of a computer system. As shown, the voltage regulator includes a controller 200 to control the switching of pull-up power transistor 211 and pull-down power transistor 212 to set the appropriate supply voltage, Vcc. When turned on, pull-up power transistor 211 pulls the output supply voltage, Vcc, up toward Vbat, which may be, for example, a battery voltage or other voltage that is higher than Vcc. Pull-down power transistor 212 pulls the output supply voltage down toward ground when it is turned on. The supply voltage, Vcc, may be fed back to controller 200 for comparison to a reference voltage.

Driver 205 of FIG. 2 may operate the power transistors according to signals provided from controller 200. Driver 205 may include an AND gate having an inverting input coupled to the gate of pull-up power transistor 211 and a non-inverting input coupled to a power manager to receive the power state status signal. The output of AND gate 206 is coupled to the gate of pull-down power transistor 212. The node between pull-up and pull-down power transistors 211 and 212 may be fed back to driver 205 and is coupled to stabilizer circuit 215. Stabilizer circuit 215 may include an inductor 216, a resistor 217, and a capacitor 218, to stabilize and smooth the output supply voltage Vcc by eliminating ripples created by the switching of power transistors 211 and 212.

In accordance with alternate embodiments, a voltage regulator may be defined to include more or fewer circuit elements than those shown in FIG. 2, and the voltage regulator of FIG. 2 may be partitioned differently. For example, multiple elements may be integrated into a single component, and single elements may be divided into multiple components.

The voltage provided at the output of the voltage regulator of FIG. 2 may supply a voltage, Vcc, to multiple components of the computer system. For example, for an embodiment in which the voltage regulator of FIG. 2 is voltage regulator VR5 116 of FIG. 1, the output voltage, Vcc, may be supplied to peripheral devices 110–115. Continuing with this example, the power state status signal provided to the input of AND gate 206 may indicate the power state of peripheral devices 110-115. For example, the power state status signal may indicate when peripheral devices 110–115 transition between a sleep state and a wake state.

In accordance with one embodiment, a transition from a sleep state to a wake state for peripheral devices 110–115 of FIG. 1 may be defined to occur when one or more of peripheral devices 110–115 transitions from a sleep state to a wake state while the remainder of the devices are already in a wake state. Similarly, a transition from a wake state to a sleep state may be defined to occur when one or more of the devices transitions from a wake state to a sleep state while the remainder of the devices are already in a sleep state.

AND gate 206 of FIG. 2 acts as a pass gate, allowing an inverse of the pull-up signal that controls pull-up power transistor 211 to control pull-down power transistor 212 depending on the power state status signal provided to the control input of the pass gate (i.e. the non-inverting input of AND gate 206). For example, when the power state status signal is logically high, indicating that peripheral devices 110–115 are in a wake state, the signal at the inverting input to AND gate 206 is allowed to pass through to the gate of pull-down power transistor 212. Under these conditions, pull-down power transistor 212 may operate synchronously with pull-up power transistor 211. Thus, the voltage regulator operates in a synchronous mode. Note that in accordance with an alternate embodiment, the power state status signal may be logically low to indicate that peripheral devices 110–115 are in a wake state. For this embodiment, the pass gate represented by AND gate 206 may be modified to accommodate the inverted logic by, for example, replacing AND gate 206 with a NOR gate having non-inverting inputs.

Conversely, when the power state status signal is logically low, indicating that peripheral devices 110–115 are in a sleep state, the signal at the inverting input to AND gate 206 of FIG. 2 is not allowed to pass through to the gate of pull-down power transistor 212. Under these conditions, pull-down power transistor 212 is turned off, thereby operating non-synchronously with pull-up power transistor 211. Thus, the voltage regulator operates in a non-synchronous mode. Note that in accordance with an alternate embodiment, the power state status signal may be logically high to indicate that peripheral devices 110–115 are in a sleep state. For this embodiment, the pass gate represented by AND gate 206 may be modified to accommodate the inverted logic by, for example, replacing AND gate 206 with a NOR gate having non-inverting inputs.

For one embodiment, during the non-synchronous mode of operation of the voltage regulator of FIG. 2, pull-down power transistor 212 may be turned off while pull-up power transistor 211 continues to switch on and off at a switching frequency. This may reduce leakage current and switching power loss associated with pull-down power transistor 212. Thus, the power conversion efficiency of the voltage regulator may be improved. Alternatively, during the non-synchronous mode of operation, pull-down power transistor 212 of FIG. 2 may be operated at a lower switching frequency than the switching frequency controlling pull-up power transistor 211, rather than being turned off. This may also reduce leakage current and switching power loss associated with pull-down power transistor 212.

Figure 3:
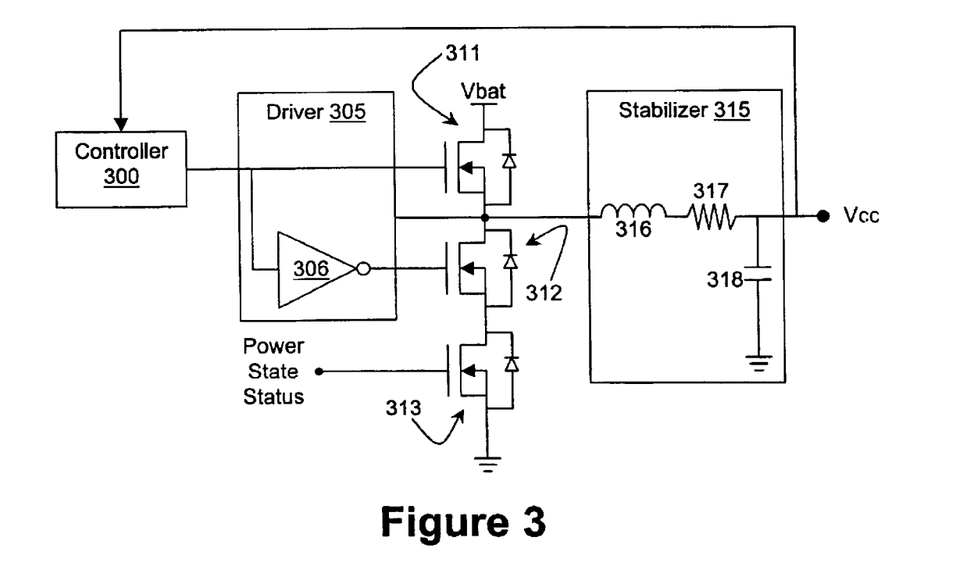
FIG. 3 includes an example of a second circuit.

FIG. 3 includes an example of a circuit in accordance with an alternate embodiment. The circuit of FIG. 3 may be a switching voltage regulator that supplies power to at least a portion of a computer system. As shown, the voltage regulator includes a controller 300 to control the switching of pull-up power transistor 311 and pull-down power transistor 312 to set the appropriate supply voltage, Vcc. In addition, the voltage regulator includes another pull-down power transistor 313 having a gate coupled to a power manager such that pull-down power transistor 313 may be controlled by the power state status signal from the power manager. When pull-up power transistor 311 is turned on, it pulls the output supply voltage, Vcc, up toward Vbat. Pull-down power transistors 312 and 313 pull the output supply voltage down toward ground when they are turned on. The supply voltage, Vcc, may be fed back to controller 300 of FIG. 3 for comparison to a reference voltage.

Driver 305 may operate the power transistors according to signals provided from controller 300. Driver 305 may include an inverter 306 having an input coupled to the gate of pull-up power transistor 311 and an output coupled to the gate of pull-down power transistor 312. The node between pull-up and pull-down power transistors 311 and 312 may be fed back to driver 305 and is coupled to stabilizer circuit 315. Stabilizer circuit 315 may include an inductor 316, a resistor 317, and a capacitor 318, to stabilize and smooth the output supply voltage Vcc by eliminating ripples created by the switching of power transistors 311 and 312.

In accordance with alternate embodiments, a voltage regulator may be defined to include more or fewer circuit elements than those shown in FIG. 3, and the voltage regulator of FIG. 3 may be partitioned differently. For example, multiple elements may be integrated into a single component, and single elements may be divided into multiple components.

The voltage regulator of FIG. 3 may operate in much the same way as the voltage regulator of FIG. 2 described above. Additional pull-down power transistor 313 is added, however, in series with pull-down power transistor 312. For this embodiment, transistor 312 may operate synchronously with transistor 311 regardless of the power state status signal. The voltage regulator as a whole, however, operates non-synchronously when the power state status signal indicates that multiple components powered by Vcc are in sleep modes by turning off transistor 313. This may reduce the leakage current through the pull-down power transistors during the non-synchronous mode of operation. Thus, the power conversion efficiency of the voltage regulator may be improved. Alternatively, during the non-synchronous mode of operation, pull-down power transistor 312 may be operated at a lower switching frequency than the switching frequency controlling pull-up power transistor 311, rather than being turned off. This may further reduce leakage current in addition to switching power loss associated with the pull-down power transistors.

Figure 4:
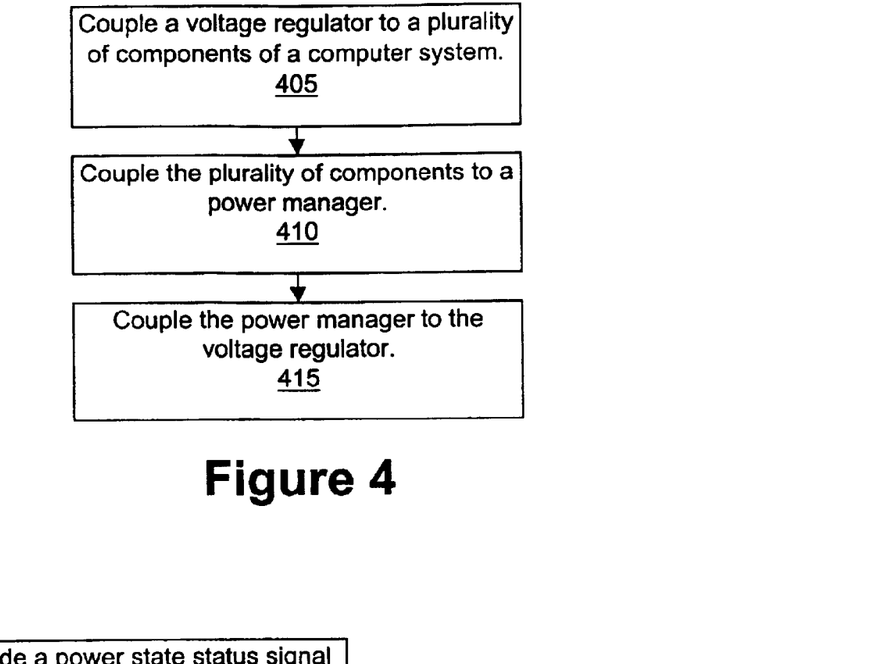
FIG. 4 includes a first flow chart.

FIG. 4 includes a flow chart in accordance with an embodiment. At block 405 a voltage regulator may be coupled to a plurality of components of a computer system. The voltage regulator may provide a supply voltage to power these components of the computer system. At block 410, the plurality of components may be coupled to a power manager of the computer system. This power manager may be formed, for example, in accordance with the ACPI specification. The power manager may be made aware of the power states of the plurality of components. At block 415, the power manager is coupled to the voltage regulator to, for example, enable the power manager to provide a power state status signal to the voltage regulator.

Figure 5:
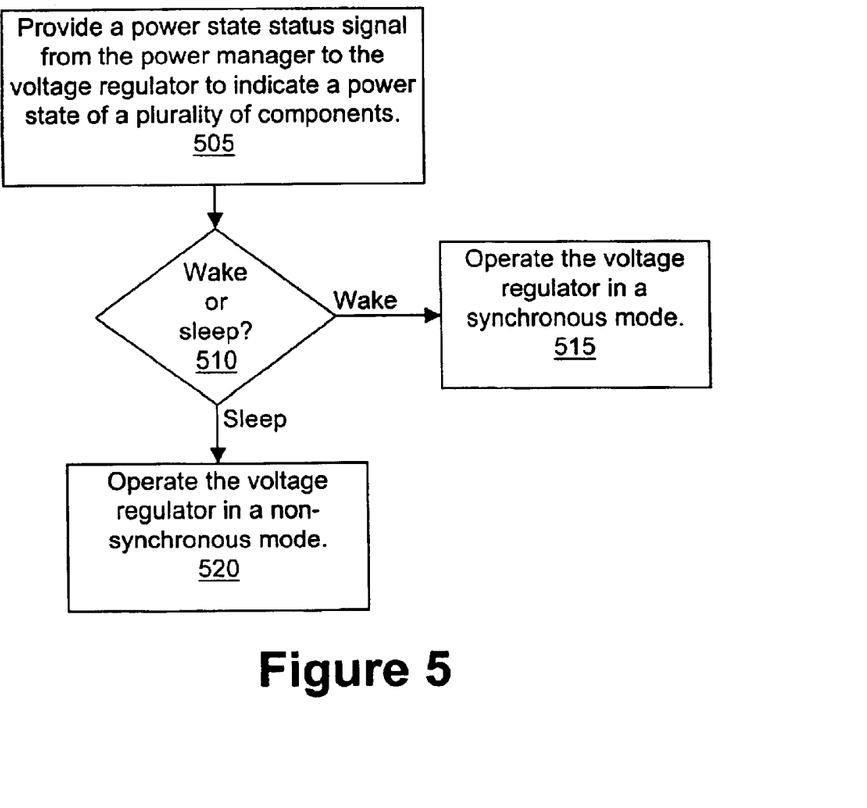
FIG. 5 includes a second flow chart.

FIG. 5 includes a flow chart in accordance with an embodiment. At block 505, a power state status signal is provided from the power manager to the voltage regulator to indicate the power state of the plurality of components powered by the voltage regulator. Next, at block 510, the power state status signal indicates if the plurality of components is in a wake state or a sleep state. If the components are in a wake state, the process proceeds to block 515, and the voltage regulator is operated in a synchronous mode. If, however, the components are in a sleep state, the process proceeds to block 520, and the voltage regulator is operated in a non-synchronous mode.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system comprising:
a power manager to generate a power state status signal to indicate a power state of a plurality of components of the computer system; and
a voltage regulator to supply a voltage to the plurality of components and to transition between synchronous and non-synchronous modes of operation when the plurality of components transitions between first and second power states, as indicated by the power state status signal, wherein the plurality of components transitions from the first power state to the second power state when at least one component of the plurality of components transitions from the first power state to the second power state while a power state of a remainder of the plurality of components remains unchanged.

2. The computer system of claim 1, wherein the plurality of components includes a hard disk drive.

3. The computer system of claim 1, wherein the voltage regulator is to transition to a non-synchronous mode of operation when the plurality of components transitions to a sleep state.

4. The computer system of claim 3, wherein the voltage regulator is to transition to a synchronous mode of operation when the plurality of components transitions to a wake state.

5. The computer system of claim 1, wherein the voltage regulator is to transition to a synchronous mode of operation when the plurality of components transitions to a wake state.

6. The computer system of claim 1, wherein the voltage regulator includes a pull-up power transistor and a pull-down power transistor, the pull-up power transistor to be controlled by a pull-up signal and the pull-down power transistor to be controlled by a pull-down signal that is a function of the pull-up signal and the power state status signal.

7. The computer system of claim 6, wherein the voltage regulator includes a pass gate having an input coupled to a gate of the pull-up power transistor to receive the pull-up signal, a control input coupled to the power manager to receive the power state status signal, and an output coupled to a gate of the pull-down power transistor to provide the pull-down signal.

8. The computer system of claim 1, wherein the voltage regulator includes a pull-up power transistor to be controlled by a pull-up signal, a first pull-down power transistor to be controlled by a pull-down signal that is a function of the pull-up signal, and a second pull-down power transistor to be controlled by the power state status signal.

9. The computer system of claim 1, further comprising a processor and a hub coupled between the processor and the plurality of components, the hub being coupled to the voltage regulator and including the power manager.

10. The computer system of claim 1, wherein at least a portion of the power manager is distributed among the plurality of components.

11. The computer system of claim 1, wherein the power state status signal indicates a suspend to RAM state.

12. A voltage regulator comprising:
an input to receive a power state status signal to indicate power states of first and second components of a computer system;
an output to supply a voltage to the first and second components at a voltage level;
a pull-up power transistor to raise the voltage level; and
a pull-down power transistor to lower the voltage level, the pull-down power transistor to operate synchronously with the pull-up power transistor when the power state status signal indicates that the first and second components are in wake states, and to operate non-synchronously with the pull-up power transistor when the power state status signal indicates that the first and second components are in sleep states.

13. The voltage regulator of claim 12, wherein the pull-down power transistor is to be off when the power state status signal indicates that the first and second components are in sleep states.

14. The voltage regulator of claim 12, wherein the power state status signal indicates a suspend to RAM state.

15. The voltage regulator of claim 12, further comprising a pass gate having a first input coupled to a gate of the pull-up power transistor, a control input coupled to the input of the voltage regulator to receive the power state status signal, and an output coupled to a gate of the pull-down power transistor.

16. The voltage regulator of claim 15, wherein the first input of the pass gate is an inverting input.

17. The voltage regulator of claim 12, wherein the pull-down power transistor is to operate at a lower switching frequency than the pull-up power transistor when the power state status signal indicates that the first and second components are in sleep states.

18. A voltage regulator comprising:
an input to receive a power state status signal to indicate power states of first and second components of a computer system;
an output to supply a voltage to the first and second components at a voltage level;
a pull-up power transistor to raise the voltage level; and
first and second pull-down power transistors to lower the voltage level, the first pull-down power transistor to be off when the power state status signal indicates that the first and second components are in sleep states.

19. The voltage regulator of claim 18, wherein a gate of the first pull-down power transistor is coupled to the input.

20. The voltage regulator of claim 18, wherein the power state status signal indicates a suspend to RAM state.

21. The voltage regulator of claim 18, wherein a gate of the second pull-down power transistor is coupled to a gate of the pull-up power transistor via an inverter to operate the second pull-down power transistor synchronously with the pull-up power transistor.

22. The voltage regulator of claim 21, wherein a gate of the first pull-down power transistor is coupled to the input.

23. A computer system comprising:
a power manager to generate a power state status signal to indicate a power state of a plurality of components of the computer system;
a voltage regulator to supply a voltage to the plurality of components and to transition between synchronous and non-synchronous modes of operation when the plurality of components transitions between first and second power states, as indicated by the power state status signal; and
a processor and a hub coupled between the processor and the plurality of components, the hub being coupled to the voltage regulator and including the power manager.

24. The computer system of claim 23, wherein the plurality of components transitions from the first power state to the second power state when at least one component of the plurality of components transitions from the first power state to the second power state while a power state of a remainder of the plurality of components remains unchanged.

25. The computer system of claim 23, wherein the voltage regulator is to transition to a non-synchronous mode of operation when the plurality of components transitions to a sleep state.

26. The computer system of claim 25, wherein the voltage regulator is to transition to a synchronous mode of operation when the plurality of components transitions to a wake state.

27. The computer system of claim 23, wherein the voltage regulator is to transition to a synchronous mode of operation when the plurality of components transitions to a wake state.

28. The computer system of claim 23, wherein the voltage regulator includes a pull-up power transistor and a pull-down power transistor, the pull-up power transistor to be controlled by a pull-up signal and the pull-down power transistor to be controlled by a pull-down signal that is a function of the pull-up signal and the power state status signal.

29. The computer system of claim 28, wherein the voltage regulator includes a pass gate having an input coupled to a gate of the pull-up power transistor to receive the pull-up signal, a control input coupled to the power manager to receive the power state status signal, and an output coupled to a gate of the pull-down transistor to provide the pull-down signal.

30. The computer system of claim 23, wherein the voltage regulator includes a pull-up power transistor to be controlled by a pull-up signal, a first pull-down power transistor to be controlled by a pull-down signal that is a function of the pull-up signal, and a second pull-down power transistor to be controlled by the power state status signal.

31. The computer system of claim 23, wherein at least a portion of the power manager is distributed among the plurality of components.

32. The computer system of claim 23, wherein the power state status signal indicates a suspend to RAM state.

33. The computer system of claim 23, wherein the plurality of components includes a hard disk drive.

34. A computer system comprising:
a power manager to generate a power state status signal to indicate a power state of a plurality of components of the computer system;
a voltage regulator to supply a voltage to the plurality of components and to transition between synchronous and non-synchronous modes of operation when the plurality of components transitions between first and second power states, as indicated by the power state status. signal, wherein at least a portion of the power manager is distributed among the plurality of components.

35. The computer system of claim 34, wherein the plurality of components transitions from the first power state to the second power state when at least one component of the plurality of components transitions from the first power state to the second power state while a power state of a remainder of the plurality of components remains unchanged.

36. The computer system of claim 34, wherein the voltage regulator is to transition to a non-synchronous mode of operation when the plurality of components transitions to a sleep state.

37. A The computer system of claim 36, wherein the voltage regulator is to transition to a synchronous mode of operation when the plurality of components transitions to a wake state.

38. The computer system of claim 34, wherein the voltage regulator is to transition to a synchronous mode of operation when the plurality of components transitions to a wake state.

39. The computer system of claim 34, wherein the voltage regulator includes a pull-up power transistor and a pull-down power transistor, the pull-up power transistor to be controlled by a pull-up signal and the pull-down power transistor to be controlled by a pull-down signal that is a function of the pull-up signal and the power state status signal.

40. The computer system of claim 39, wherein the voltage regulator includes a pass gate having an input coupled to a gate of the pull-up power transistor to receive the pull-up signal, a control input coupled to the power manager to receive the power state status signal, and an output coupled to a gate of the pull-down transistor to provide the pull-down signal.

41. The computer system of 34, wherein the voltage regulator includes a pull-up power transistor to be controlled by a pull-up signal, a first pull-down power transistor to be controlled by a pull-down signal that is a function of the pull-up signal, and a second pull-down power transistor to be controlled by the power state status signal.

42. The computer system of claim 34, further comprising a processor and a hub coupled between the processor and the plurality of components, the hub being coupled to the voltage regulator and including the power manager.

43. The computer system of claim 34, wherein the power state status signal indicates a suspend to RAM state.

44. The computer system of claim 34, wherein the plurality of components includes a hard disk drive.

45. A computer system comprising:
- a power manager to generate a power state status signal to indicate a power state of a plurality of components of the computer system; and
- a voltage regulator to supply a voltage to the plurality of components and to transition between synchronous and non-synchronous modes of operation when the plurality of components transitions between first and second power states, as indicated by the power state status signal, wherein the power state status signal indicates a suspend to RAM state.

46. The computer system of claim 45, wherein the plurality of components transitions from the first power state to the second power state when at least one component of the plurality of components transitions from the first power state to the second power state while a power state of a remainder of the plurality of components remains unchanged.

47. The computer system of claim 45, wherein the voltage regulator is to transition to a non-synchronous mode of operation when the plurality of components transitions to a sleep state.

48. The computer system of claim 47, wherein the voltage regulator is to transition to a synchronous mode of operation when the plurality of components transitions to a wake state.

49. The computer system of claim 45, wherein the voltage regulator is to transition to a synchronous mode of operation when the plurality of components transitions to a wake state.

50. The computer system of claim 45, wherein the voltage regulator includes a pull-up power transistor and a pull-down power transistor, the pull-up power transistor to be controlled by a pull-up signal and the pull-down power transistor to be controlled by a pull-down signal that is a function of the pull-up signal and the power state status signal.

51. The computer system of claim 50, wherein the voltage regulator includes a pass gate having an input coupled to a gate of the pull-up power transistor to receive the pull-up signal, a control input coupled to the power manager to receive the power state status signal, and an output coupled to a gate of the pull-down transistor to provide the pull-down signal.

52. The computer system of claim 45, wherein the voltage regulator includes a pull-up power transistor to be controlled by a pull-up signal, a first pull-down power transistor to be controlled by a pull-down signal that is a function of the pull-up signal, and a second pull-down power transistor to be controlled by the power state status signal.

53. The computer system of claim 45, further comprising a processor and a hub coupled between the processor and the plurality of components, the hub being coupled to the voltage regulator and including the power manager.

54. The computer system of claim 45, wherein at least a portion of the power manager is distributed among the plurality of components.

55. The computer system of claim 45, wherein the plurality of components includes a hard disk drive.

* * * * *

UNITED STATES PATENT AND TRADEMARK OFFICE
CERTIFICATE OF CORRECTION

PATENT NO. : 6,906,433 B2
DATED : June 14, 2005
INVENTOR(S) : Nguyen

It is certified that error appears in the above-identified patent and that said Letters Patent is hereby corrected as shown below:

Column 1,
Line 55, delete "ED".

Column 10,
Line 34, delete ".".

Signed and Sealed this

Sixth Day of September, 2005

JON W. DUDAS
*Director of the United States Patent and Trademark Office*